Figure 1:
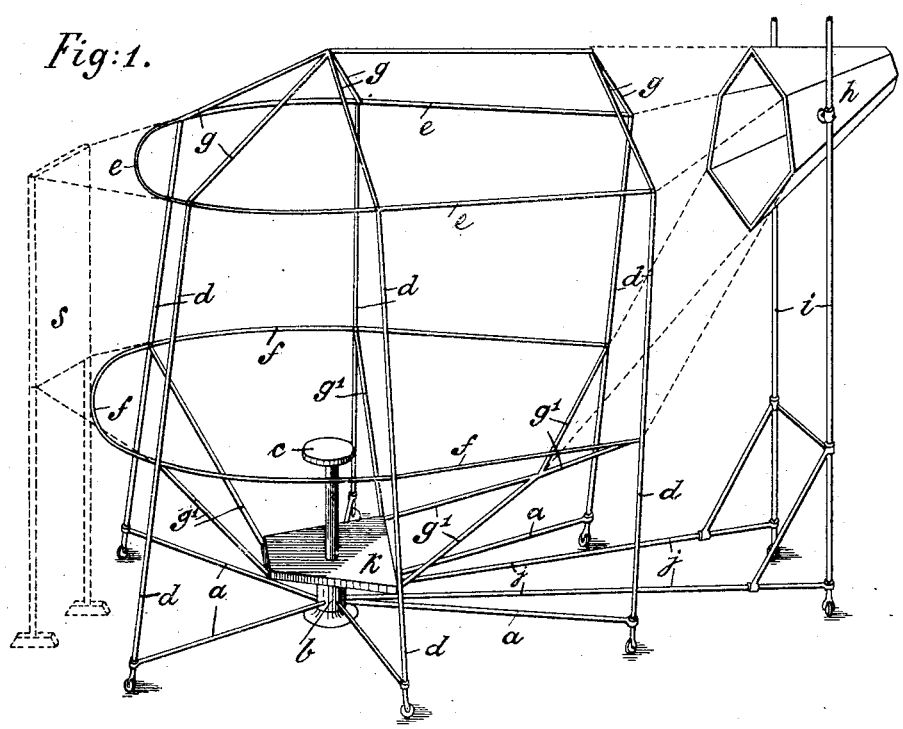

(No Model.) 2 Sheets—Sheet 1.

E. HACKH.
PHOTOGRAPHIC GALLERY.

No. 501,340. Patented July 11, 1893.

Attest
William Hall

Inventor
Eugen Hackh
by Ellis Spear
Atty.

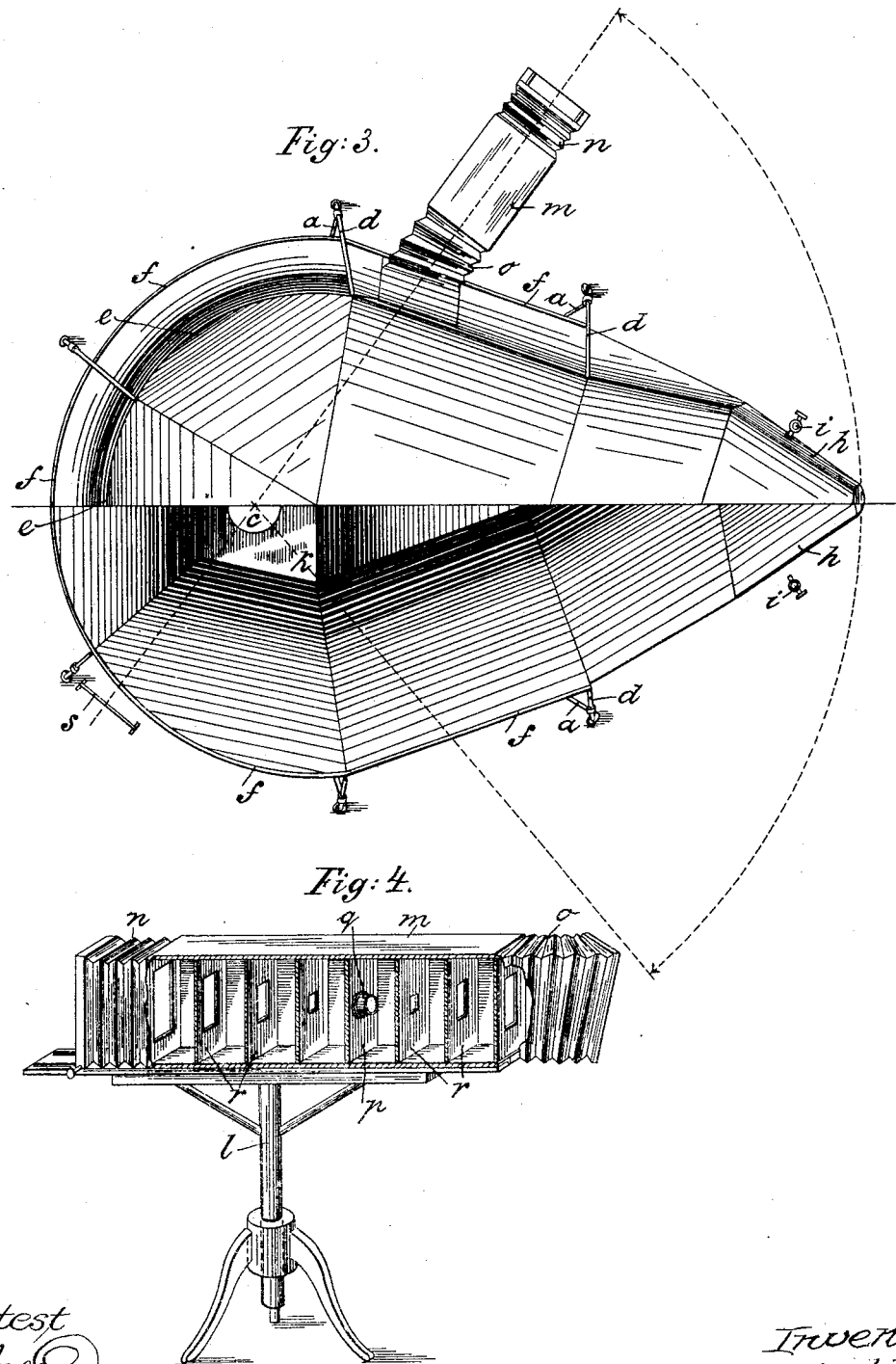

UNITED STATES PATENT OFFICE.

EUGEN HACKH, OF STUTTGART, GERMANY.

PHOTOGRAPHIC GALLERY.

SPECIFICATION forming part of Letters Patent No. 501,340, dated July 11, 1893.

Application filed November 16, 1891. Serial No. 412,076. (No model.) Patented in England October 28, 1891, No. 18,592, and in Germany December 6, 1892, No. 65,926.

*To all whom it may concern:*

Be it known that I, EUGEN HACKH, photographer, a subject of the German Emperor, and a resident of 31 Königstrasse, Stuttgart, Würtemberg, in the German Empire, have invented a certain new and useful Improved Device for Photographing in Bound Light, of which the following is a full, clear, and exact description, this invention having been patented to me in Great Britain under date of October 28, 1891, No. 18,592, and in Germany under date of December 6, 1892, No. 65,926.

My invention relates to a means for photographing in bound light. Under the expression bound light, such source of light is implied as is entirely under the control of the photographer, that is which may be increased, decreased and regulated to requirement. I not only employ direct light, *i. e.*, that light the rays of which meet the object directly, but also reflected light. The object of photographing in bound light is to enable reproduction in full or life size and to distribute the light in such manner as to render the reproduction equally sharply defined all over and to obviate a blurring of the same owing to the variation of the rays caused by the height of the object to be photographed. Photographing on this system is carried out according to my present invention by inclosing the object to be reproduced within a revoluble housing closed on all sides and formed of a combination of surfaces arranged at various angles to each other; such housing gradually converging to a funnel for the reception of the source of light. These surfaces are advantageously fitted together in such manner as to allow the angles at which they stand in regard to each other to be varied so that the object to be photographed can be illuminated in various ways according to requirement. The closed house is revolubly mounted on a pivot above which the object or person to be taken is situated, so that the latter may be illuminated in various ways and thus various light and shade effects attained. The housing may be revolved a distance covering about two hundred and seventy degrees.

In order to employ this bound light, which enables an absolutely intensive illumination of the object in question, a particular arrangement of the camera is necessary in order to prevent mirage and false reflections. For this purpose the space traversed by the rays passing from the object to the lens and by the refracted rays passing to the sensitive plate must be closed on all sides, that is to say the camera must be closed light tight on to the housing for the reception of the object to be reproduced. The lens is arranged inside the closed camera casing and the latter is provided with shades arranged at intervals in order to prevent mirage and false reflections and to strictly confine the light to the effective cone of rays. The closure of the camera onto the housing, after the latter has been adjusted in a position according to the light required, is effected in such manner that the axis of the camera, the center of the object and the back ground—if such is present—lie in one line.

In order to make this description more easily intelligible I refer to the accompanying drawings in which similar letters denote similar parts throughout the several views.

Figure 2:
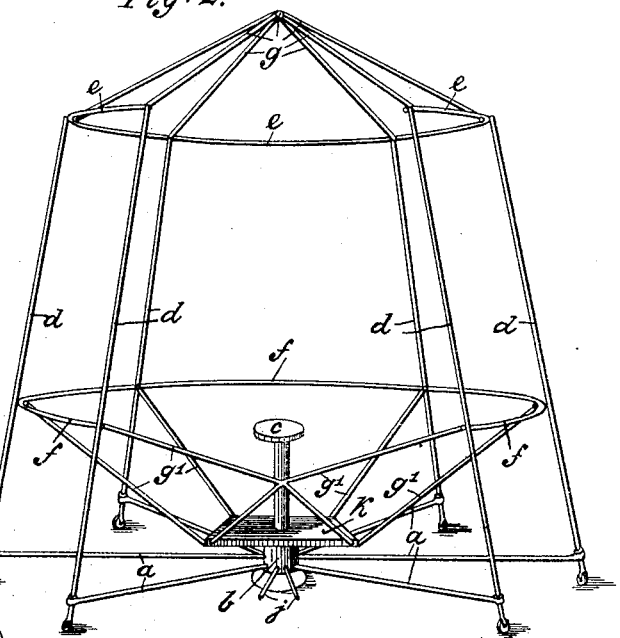

Figure 1 represents a perspective side view of the frame work of the revoluble housing. Fig. 2 is a perspective front elevation of the said framework without the funnel for the source of light. Fig. 3 shows a half top view and half ground plan of the housing and Fig. 4 is a perspective elevation partly in section of the camera arrangement.

The housing consists of a series of lower radially arranged rods $a$ fitted into the trunnion $b$ which is revoluble on a suitable pivot and above which a stool or stand $c$ is arranged for the reception of the object. The radial rods $a$ are connected to uprights $d$ provided with suitable rollers at their lower ends and connected at about the centers and at the top by the bent rods $e$ and $f$. The whole is surmounted by the ridge poles $g$ and can be closed in at the lower part by means of a suitable covering and the rods $g'$ ending at the platform K of the stool or stand $c$. The space inclosed by the rods $d\,e\,f\,g\,g'$ is closed up to the light funnel $h$ the longitudinal axis of which is inclined upwardly. The funnel $h$, in which the artificial light (electric, magnesium or other light) is arranged, is adjustable on its two uprights *i i* which are supported by the rods *j* terminating in the trunnion *b* and provided with suitable stays. The bottom of the housing is formed by the horizontal platform K, onto which the trapezium shaped sides close at an angle while the front of the said platform is closed up to the funnel *h* by means of triangular surfaces in order to obtain the requisite narrowing of the housing toward the funnel. The sides, bottom and roof of the housing are covered with a fabric capable of deadening the light leaving however the interior of the housing sufficiently light to enable the adjustment of the camera with regard to the object to be effected without the aid of the artificial light. By means of the adjustability of these surfaces the light coming from the funnel *h* can be reflected and distributed onto the object arranged on the stool *c* and the light effect regulated in various ways as may be found desirable. The prismatic funnel *h*, which is made of sheet metal can be closed on to the housing by means of a suitable fabric arranged as shown in dotted lines in Fig. 1.

The camera which is supported on the stand *l* consists of the casing *m*, having the adjustable front part *n* and the folding back extension *o*. The camera casing contains the lens *q* arranged in a partition at a suitable point in the same while the adjustable casement *n* serves for the reception of the focus and sensitive plates. The space in front of and behind the lens is provided with dark partitions *r* arranged at intervals and provided with suitable apertures so that only the effective cone of rays from the object is allowed to react on the lens. The folding back end *o* of the camera is to enable the same to be light tightly closed on to the housing as may be seen in Fig. 3. For this purpose the walls of the housing are arranged as laterally sliding blinds which may be closed onto the sides of the camera frame while the top and bottom are covered by cloths arranged in suitable manner.

The device *s* for supporting the back ground which is separate and independent from the housing, is after the adjustment of the housing arranged in such position as to lie in a line with the longitudinal axis of the camera. That part of the housing at which the back ground is arranged is opened up and the latter closed onto the housing by means of suitably arranged cloths or fabrics.

Having now particularly described and ascertained the nature of my said invention, what I claim, and desire to secure by Letters Patent, is—

1. In combination with a fixed pivot, a frame work or housing revoluble around the same having swiveled connection therewith, a stool or support movable with the frame work, a covering for said frame work, a light funnel at the upper part of one end, and a camera adjusted to an opening in the covering, substantially as described.

2. In combination with a fixed pivot, a stool or support swiveled thereon, an inclosing frame work having supporting standards *d* provided with casters and rods *a* extending to the center pivot with which they have swiveled connection, the funnel frame *i* at one end of the frame work, the light funnel *h* adjustably supported thereby at the upper end thereof, a covering for the frame work and a camera adjusted to an opening in the side of the covering, substantially as described.

In witness whereof I have hereunto signed my name in the presence of two subscribing witnesses.

EUGEN HACKH.

Witnesses:
ARTHUR BAERMANN,
EUSTACE W. HOPKINS.